C. D. PAGE.
Irrigating Apparatus.
No. 201,442.　　　　Patented March 19, 1878.
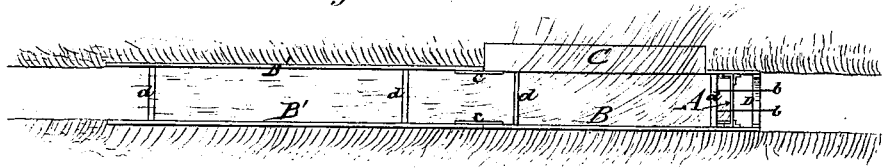
Fig. 1.
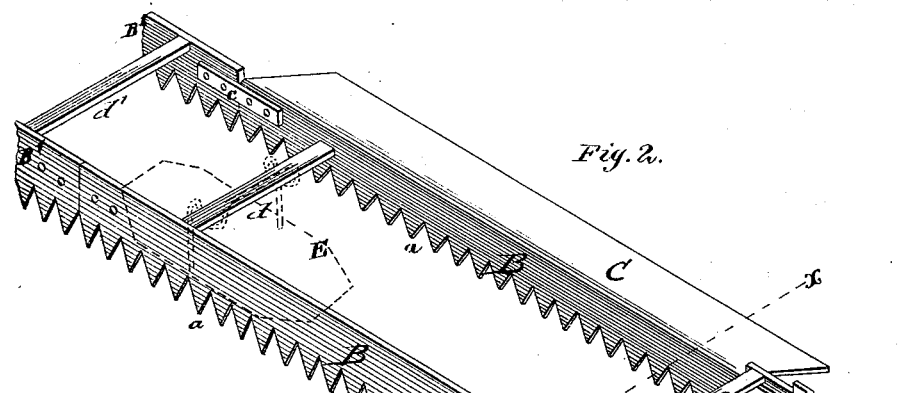
Fig. 2.
Fig. 3.
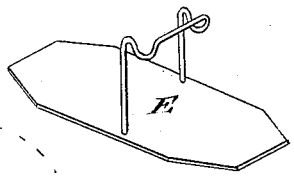
Fig. 4.
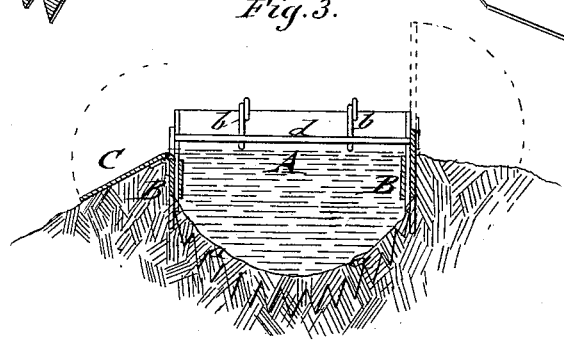
WITNESSES:
Henry N. Miller
J. H. Scarborough
INVENTOR:
C. D. Page
BY Munn & Co
ATTORNEYS.

UNITED STATES PATENT OFFICE.

CALEB D. PAGE, OF GREELEY, COLORADO.

IMPROVEMENT IN IRRIGATING APPARATUS.

Specification forming part of Letters Patent No. 201,442, dated March 19, 1878; application filed November 20, 1877.

*To all whom it may concern:*

Be it known that I, CALEB D. PAGE, of Greeley, in the county of Weld and State of Colorado, have invented a new and Improved Irrigating Apparatus, of which the following is a specification:

The object of my invention is to facilitate the irrigation of land from open ditches, to protect the banks of the irrigating ditch or stream from damage by the overflow of water during the process of irrigation, and to obviate the labor and expense of constructing and tearing up mud dams, as heretofore has been done, for the distribution of the water.

The invention consists in a portable irrigating apparatus, formed by the combination of side pieces and one or more flood-boards for the ditch-banks, with an end-gate sliding between said side pieces, the whole being connected and constructed to facilitate its depression into the ground, and to operate and be operated as hereinafter described.

In the accompanying drawing, Figure 1 represents a top view of my irrigating-dam applied to an open ditch. Fig. 2 is a perspective view of the same. Fig. 3 is a cross-section through the line $x\,x$ of Fig. 2. Fig. 4 is a perspective of a detail.

Similar letters of reference indicate corresponding parts.

My invention is designed especially for irrigation by open ditches and streams, which is done in the following manner: At right angles to and issuing from a lateral main, ditches are dug at suitable distances apart, and of proper capacity to irrigate the intervening bed or section of land. At distances apart depending on the greater or less undulation of the ground, these ditches are divided in sections by cross-dams built of dirt taken from the bank bordering upon the bed being irrigated, which, after the irrigation of each section, have to be torn up to allow the water to flow to the next section. The consequence is, that the said bank is destroyed by the overflow, and in tearing up the dam a large portion of the latter is carried away by the current, and gradually fills the ditch.

The above remarks, introductory to the description, will facilitate the understanding of my invention, designed to overcome these difficulties.

A is the gate, and B are the side pieces, of the dam. The gate A is fitted to slide in ways or guides in the vertical side pieces B, which are connected at the desired distance apart to fit the width of the ditch by the cross-bars $d$. The gate is operated by the two second-class levers $b$, which have their fulcra on one of the cross-bars $d$, and its movement up or down is limited by the chains or rods $b'$ connecting it with the side pieces B.

D is a cross-bar for standing on while operating the gate by the levers $b$. E is a float, which carries the upper end of the siding. One of the side pieces is made lower than the other, to allow the overflow of water when the gate is closed, and is bent over to form the overflow-board C, for the protection of the bank bordering upon the bed being irrigated.

The overflow-board C may be hinged to the side piece B, and applied on both sides of the ditch, as seen in Fig. 2, to be alternately raised and lowered for irrigating the beds on either side of the ditch.

B' are side pieces, connected together by cross-bars $d'$, and similar to the side pieces B, to which they may be secured by splices $c$, when it becomes necessary to lengthen the apparatus from the gate-section up stream, (or toward the lateral main,) for protecting the banks and preventing overflow, the number of sections B' used being dependent on the fall and consequent velocity of the water. The lower edges of side pieces and gate are serrated, or provided with teeth $a$, to facilitate their insertion in the ground by cutting off weeds and grass, which, with a straight edge, would be more difficult.

I prefer to make the cross-bars D $d\,d'$, levers $b$, and float E of wood, and the side pieces B B' of sheet-iron, with teeth $a$ of steel, and strengthened by wooden ribs running along their entire lengths.

A sufficient number of sections of side pieces B' and the side pieces B (all to be connected together by the splices $c$) being adjusted to lie along the top of either ditch-bank, the dam is put together, and the gate A is forced down by the levers $b$, (the operator standing on the cross-bar D,) the siding pressed down into the earth of the banks, and the water allowed to flow from the lateral main through the ditch, and checked by the gate A, overflows the board C and irrigates the bed.

To move the dam for irrigating farther down the bed, the tail or upper end of the dam or siding is raised up, so that the cross-bar will rest on the float E, as shown in dotted lines in Fig. 2. The lower end is raised by means of the levers $b$, and the dam carried farther down the bed.

I do not limit or confine myself to the exact form or arrangement of any of the parts herein described, as they may be varied without departing from my invention.

Having thus described my invention, I claim as new and desire to secure by Letters Patent—

1. A portable irrigating apparatus or mechanism, consisting of a movable gate, A, and adjustable side pieces B, constructed and operating substantially as herein set forth.

2. The combination, with the said irrigating apparatus or mechanism A B, of one or more flood-boards, C, substantially as and for the purpose set forth.

3. The float E, in combination with the side pieces B, substantially as and for the purpose specified.

4. The gate A and side pieces B, with teeth or serrations $a$, substantially as and for the purpose specified.

5. The levers $b$, in combination with the gate A and side pieces B, substantially as set forth.

6. The combination of the foot-piece D with the side pieces B, substantially as herein shown, so that the weight of the operator in raising or lowering of the gate will securely hold the side piece in place.

CALEB D. PAGE.

Witnesses:
E. T. DUNNING,
H. N. HAYNES.